(12) United States Patent
Govindassamy et al.

(10) Patent No.: US 11,246,015 B2
(45) Date of Patent: Feb. 8, 2022

(54) METHODS AND APPARATUSES FOR CHARGING OF A SERVICE SESSION OF M2M DEVICES IN A COMMUNICATION NETWORK

(71) Applicant: Telefonaktiebolaget LM Ericsson (publ), Stockholm (SE)

(72) Inventors: Meenakshi Sundaram Govindassamy, Chennai (IN); Karthikeyan Premkumar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 16/334,809

(22) PCT Filed: Sep. 30, 2016

(86) PCT No.: PCT/IN2016/050332
§ 371 (c)(1),
(2) Date: Mar. 20, 2019

(87) PCT Pub. No.: WO2018/061017
PCT Pub. Date: Apr. 5, 2018

(65) Prior Publication Data
US 2020/0021955 A1    Jan. 16, 2020

(51) Int. Cl.
*H04W 4/24* (2018.01)
*H04W 4/70* (2018.01)
(Continued)

(52) U.S. Cl.
CPC .......... *H04W 4/24* (2013.01); *H04L 12/1432* (2013.01); *H04L 12/1439* (2013.01);
(Continued)

(58) Field of Classification Search
CPC ..... H04W 4/24; H04W 4/70; H04W 28/0215; H04W 4/00; H04L 12/1432;
(Continued)

(56) References Cited

U.S. PATENT DOCUMENTS 7,965,996 B1 *  6/2011  Goldberg .......... H04M 15/8228
                                                          455/405
9,125,003 B2    9/2015  Ma et al.
(Continued)

FOREIGN PATENT DOCUMENTS

WO    WO 2012/142955 A1    10/2012

OTHER PUBLICATIONS

International Search Report and Written Opinion of the International Searching Authority for International Application No. PCT/IN2016/050332 dated Jan. 20, 2017.
(Continued)

*Primary Examiner* — Un C Cho
*Assistant Examiner* — Yu-Wen Chang
(74) *Attorney, Agent, or Firm* — Sage Patent Group

(57) ABSTRACT

The present disclosure relates to a method performed in an operator network providing data network connectivity to Machine-to-Machine (M2M) devices, for charging of a service session involving a plurality of the M2M devices. The method comprises, from each of the plurality of M2M devices involved in the service session, receiving a service message comprising a service identifier (SID) corresponding to the service session. The method also comprises, by means of the received SID from each of the plurality of M2M devices, determining the number of M2M devices involved in the service session. The method also comprises, based on the determined number of M2M devices, calculating a (Continued)

charging rate for the service session. The method also comprises using the calculated rate, charging the service session.

16 Claims, 6 Drawing Sheets

(51) Int. Cl.
    *H04L 12/14*     (2006.01)
    *H04L 29/08*     (2006.01)
    *H04W 28/02*     (2009.01)

(52) U.S. Cl.
    CPC .......... *H04L 67/143* (2013.01); *H04L 67/146* (2013.01); *H04W 4/70* (2018.02); *H04W 28/0215* (2013.01)

(58) Field of Classification Search
    CPC . H04L 12/1439; H04L 67/143; H04L 67/146; H04L 12/14; H04M 15/61; H04M 15/80; H04M 15/64; H04M 15/765; H04M 15/775; H04M 15/8228; H04M 15/852
    See application file for complete search history.

(56) References Cited

U.S. PATENT DOCUMENTS

| | | | |
|---|---|---|---|
| 2012/0163271 A1* | 6/2012 | Kwon | H04W 4/06 370/312 |
| 2013/0003609 A1 | 1/2013 | Ballot et al. | |
| 2013/0188515 A1* | 7/2013 | Pinheiro | H04L 67/16 370/254 |
| 2013/0212236 A1* | 8/2013 | Foti | H04W 12/04031 709/221 |
| 2013/0265932 A1* | 10/2013 | Huang | H04W 60/00 370/312 |
| 2013/0339438 A1* | 12/2013 | Cherian | H04W 8/186 709/204 |
| 2014/0089442 A1* | 3/2014 | Kim | H04W 4/70 709/206 |
| 2014/0105009 A1* | 4/2014 | Vos | H04L 47/2475 370/230 |
| 2014/0351403 A1* | 11/2014 | Lin | H04L 67/16 709/223 |
| 2015/0016307 A1* | 1/2015 | Liu | H04L 12/1432 370/259 |
| 2015/0029894 A1 | 1/2015 | Lu et al. | |
| 2015/0105044 A1 | 4/2015 | Maguire | |
| 2015/0381763 A1* | 12/2015 | Moon | H04W 28/24 709/203 |
| 2016/0248871 A1 | 8/2016 | Seed et al. | |
| 2018/0007172 A1* | 1/2018 | Wang | H04L 67/24 |

OTHER PUBLICATIONS

Extended European Search Report dated Aug. 6, 2019 for European Patent Application No. 16917601.3, 13 pages.

\* cited by examiner

METHODS AND APPARATUSES FOR CHARGING OF A SERVICE SESSION OF M2M DEVICES IN A COMMUNICATION NETWORK

TECHNICAL FIELD

The present disclosure relates to methods and devices for charging of a service session in an operator network providing connectivity to a plurality of Machine-to-Machine (M2M) devices involved in the service session.

BACKGROUND

The Internet of Things (IoT) is the network of physical objects such as user devices, vehicles, buildings and other objects embedded with electronics, software, sensors, and network connectivity, that enables these objects to collect and exchange data. The Internet of Things allows objects to be sensed and controlled remotely across existing network infrastructure, creating opportunities for more direct integration of the physical world into computer-based systems, and resulting in improved efficiency, accuracy and economic benefit when IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system but is able to interoperate within the existing Internet infrastructure.

"Things," in the IoT sense, can refer to a wide variety of devices such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. The "Things" may be viewed as an inextricable mixture of hardware, software, data and service. These devices collect useful data with the help of various existing technologies and then autonomously flow the data between other devices. Current market examples include smart thermostat systems and washer/dryers that use Wi-Fi for remote monitoring.

As well as the expansion of Internet-connected automation into a plethora of new application areas, IoT is also expected to generate large amounts of data from diverse locations, with the consequent necessity for quick aggregation of the data, and an increase in the need to index, store, and process such data more effectively. IoT is one of the platforms of today's Smart City, and Smart Energy Management Systems.

Charging and Rating of traffic in a communication network of a network operator providing connectivity to IoT devices is today performed by means of static rules configured for pre-identified and pre-defined services which may be cumbersome in case of IoT M2M devices since there could be many services offered to the end user which may not be practically possible to identify and configure in the system.

Today, charging is based on usage parameters such as volume, duration etc. which may not be applicable to IoT M2M devices since it may not be desirable to charge the user for bytes (data charging) or duration of usage since the devices can exchange periodically lots of messages, all of which will not add value to the end user using such IoT M2M devices.

SUMMARY

It is an objective of the present disclosure to provide an improved way of calculating a charging rate for usage of an operator network which is more suitable for the emerging IoT.

Usually in the IoT M2M systems the number of connected devices will be very high and it may be difficult to rate and charge using the conventional methods i.e. usage-based for example volume, time, events. Also, it may be difficult to preconfigure such rating rules based on the conventional methods in IoT M2M systems since the prior knowledge about how the system will be used may not be sufficient.

Apart from that, it will be difficult to identify the service used e.g. in a telecommunications system. It is possible to clearly identify service such as Voice, data, SMS and perform the rating. However, in an IoT M2M situation, for example where there is a central device which communicates with multiple number of devices in a house in order to monitor and initiate an action, e.g. the central device will monitor the refrigerator, door, air conditioners, room temperatures, lights etc. and co-ordinate among themselves to initiate action such as order milk if needed, switch on light when the door is opened, switch on air conditioner if the room temperature drops etc. In such case, according to the traditional charging and rating applications services need to be defined such as for example "open door", "AC SwitchOn" etc. in order to assign the rating rules so the number of services will be far higher since the devices can perform innumerable operations, increasing the complexity of the rating logic.

Embodiments of the present disclosure will enable dynamic online rating and charging using the end points involved in a communication flow for devices connected in IoT systems.

According to an aspect of the present disclosure, there is provided a method performed in an operator network providing data network connectivity to Machine-to-Machine (M2M) devices, for charging of a service session involving a plurality of the M2M devices. The method comprises, from each of the plurality of M2M devices involved in the service session, receiving a service message comprising a service identifier (SID) corresponding to the service session. The method also comprises, by means of the received SID from each of the plurality of M2M devices, determining the number of M2M devices involved in the service session. The method also comprises, based on the determined number of M2M devices, calculating a charging rate for the service session. The method also comprises using the calculated rate, charging the service session.

According to another aspect of the present disclosure, there is provided a computer program product comprising computer-executable components for causing an operator network to perform an embodiment of a method of the present disclosure when the computer-executable components are run on processing circuitry comprised in the operator network.

According to another aspect of the present disclosure, there is provided an operator network configured for providing data network connectivity to M2M devices. The operator network comprises processing circuitry, and storage storing instructions executable by said processing circuitry whereby said operator network is operative to from each of a plurality of M2M devices involved in a service session, receive a service message comprising a SID corresponding to the service session. The operator network is also operative to, by means of the received SID from each of the plurality of M2M devices, determine the number of M2M devices involved in the service session. The operator network is also operative to, based on the determined number of M2M devices, calculate a charging rate for the service session. The operator network is also operative to, using the calculated rate, charge the service session.

According to another aspect of the present disclosure, there is provided a method performed in a service provider network providing a service to a user by means of a plurality of M2M devices, for facilitating charging of a service session involving the plurality of M2M devices. The method comprises, from each of the plurality of M2M devices, receiving a service triggering message. The method also comprises, in response to the received service triggering messages, sending an acknowledgement message to each of the plurality of M2M devices, the acknowledgement message comprising a SID corresponding to the service session and being configured for being presented to an online charging system (OCS), typically of an operator network of a network operator.

According to another aspect of the present disclosure, there is provided a computer program product comprising computer-executable components for causing a service provider network to perform an embodiment of a method of the present disclosure when the computer-executable components are run on processing circuitry comprised in the service provider network.

According to another aspect of the present disclosure, there is provided a service provider network configured for providing a service to a user by means of a plurality of M2M devices. The service provider network comprises processing circuitry, and storage storing instructions executable by said processing circuitry whereby said service provider network is operative to, from each of the plurality of M2M devices, receive a service triggering message. The service provider network is also operative to, in response to the received service triggering messages, send an acknowledgement message to each of the plurality of M2M devices, the acknowledgement message comprising a SID corresponding to the service session and being configured for being presented to an OCS.

According to another aspect of the present disclosure, there is provided a method performed by an M2M device, for facilitating charging of a service session involving the M2M device. The method comprises sending a service triggering message to a service provider network providing a service to a user by means of the M2M device. The method also comprises, in response to the sent service triggering message, receiving an acknowledgement message comprising a SID corresponding to a service session of the service. The method also comprises, to an operator network providing data network connectivity to the M2M device, sending a service message comprising the SID.

According to another aspect of the present disclosure, there is provided a computer program product comprising computer-executable components for causing a M2M device to perform an embodiment of a method of the present disclosure when the computer-executable components are run on processing circuitry comprised in the M2M device.

According to another aspect of the present disclosure, there is provided an M2M device comprising processing circuitry, and storage storing instructions executable by said processing circuitry whereby said M2M device is operative to send a service triggering message to a service provider network providing a service to a user by means of the M2M device. The M2M device is also operative to, in response to the sent service triggering message, receive an acknowledgement message comprising a SID corresponding to a service session of the service. The M2M device is also operative to, to an operator network providing data network connectivity to the M2M device, send a service message comprising the SID.

According to another aspect of the present disclosure, there is provided a method performed in a communication network comprising a service provider network and an operator network, for facilitating charging of a service session provided by the service provider network by means of a plurality of M2M devices being provided with data network connectivity by the operator network. The method comprises the service provider network sending an acknowledgement message to each of the plurality of M2M devices to be involved in the service session, the acknowledgement message comprising a SID corresponding to the service session. The method also comprises each of the plurality of M2M devices involved in the service session sending a service message comprising the SID to the operator network. The method also comprises, by means of the SID from each of the plurality of M2M devices, the operator network determining the number of M2M devices involved in the service session. The method also comprises, based on the determined number, calculating a charging rate for the service session. The method also comprises, using the calculated rate, charging the service session.

According to another aspect of the present disclosure, there is provided a communication network comprising the operator network of the present disclosure, the service provider network of the present disclosure, and the plurality of M2M devices of the present disclosure.

By means of embodiments of the present disclosure, service sessions may be charged based on the number of M2M devices involved in the service session, without the operator network, e.g. the OCS thereof, needing to know what the service is. With a rating method which comprises dynamically calculating the number of M2M devices involved in a IoT M2M service session, with communication within an operator network, offering a service to an end user, possibly also considering the service class, e.g. indicating the criticality, of the devices/service involved in the IoT M2M service session.

Hence the rating method may be agnostic of the service and consumed units (bytes, seconds etc.) which need not be pre-configured or identified for calculating the rate and performing charging.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
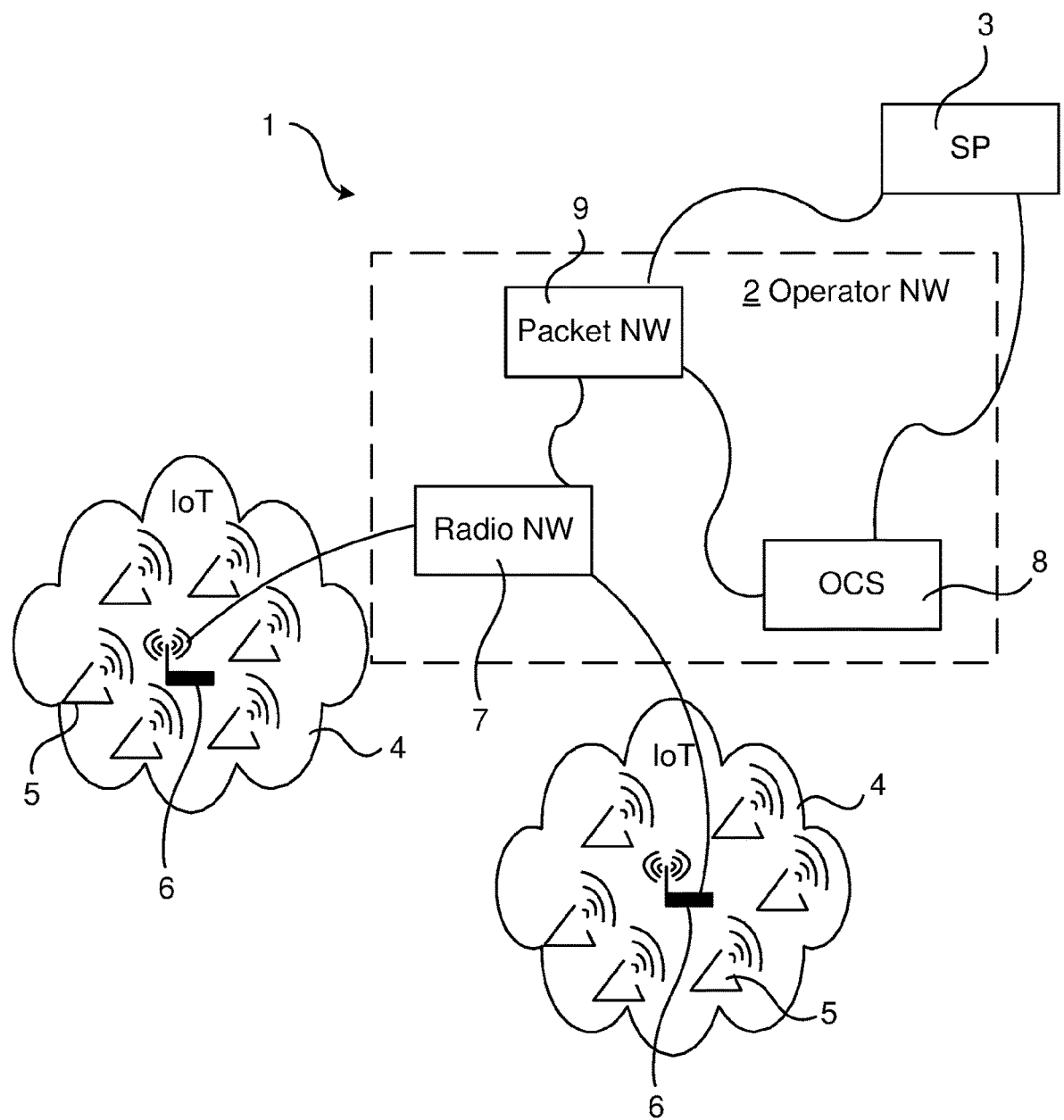
FIG. 1 is a schematic block diagram of an embodiment of a communication network, in accordance with the present disclosure.

FIG. 1 illustrates an embodiment of a communication network 1, comprising an operator network (NW) 2, a service provider (SP) network 3 e.g. in a cloud network, and one or more (here two) IoT networks 4, each IoT network 4 comprising a plurality of IoT M2M devices 5 optionally communicating via a router 6 of the IoT network 4. The IoT devices 5 may be connected to the router 6 wirelessly or via wire. The operator NW 2 comprises a radio NW 7, e.g. a Radio Access Network (RAN) such as a Third Generation Partnership Project (3GPP) RAN or a Wireless Local Area Network (WLAN) RAN, or any other type of RAN such as Zigbee, Bluetooth or Long-Range Radio, for wireless communication with the M2M devices 5, possibly via a router 6. The operator NW also comprises an Online Charging System (OCS) 8 for charging service sessions to e.g. the SP or the user of the service. The operator NW may also comprise a packet NW 9, which may or may not be part of or connected to the Internet, via which the radio NW 7 may communicate with e.g. the OCS 8 thus providing connection between the OCS and the M2M devices, as well as with the SP 3 thus providing connection between the SP and the M2M devices.

The M2M devices 5 may be configured by the end-user of the service for custom made cloud services provided by the SP 3. These services along with any services defined by the operator (e.g. telecommunication operator) of the operator NW 2 are charged by the OCS 8 and/or any offline billing systems based on the data available from the cloud service provider 3 and/or from the packet network 9 that enables the connection between the M2M devices 5 and the cloud service provider 3.

The devices 5 in the IoT M2M NW 4, for example smart houses, agricultural monitoring systems, healthcare monitoring systems etc. may communicate among themselves and send the collected information to SP 3 through the radio NW 7 and/or the packet (core) NW 9 where they are monitored, controlled and instructed for taking pre-configured actions which results in providing an end-user value.

In order to monetize the IoT M2M systems apart from initiating the actions, the IoT M2M systems are in communication with the OCS or Billing Domain (BD) 8 where usually the rating rules are configured which determines the pricing and the calculated price is charged to a user account and the user is informed with the details. In case of a prepaid user account with the operator network 2 operator, the calculated charge may be deducted from the user account and in case of post-paid user account the calculated charges are accumulated and invoiced to the user.

Also, the communication between the IoT M2M devices 5 and the OCS/BD 8 may be through an online/real time credit control using Authentication, Authorization, Accounting protocols such as diameter (e.g. Request for Comments (RFC) 6733) as defined by the Internet Engineering Task Force (IETF) or offline billing protocols such as Bx.

Charging and Rating is today performed by means of static rating rules configured in the rating engine for pre-identified and pre-defined services e.g. Voice, data services etc. by the operator of the operator NW 2 providing network connection to the M2M devices 5.

This may be problematic in the IoT M2M domain, since there could be services that the end user can create and use locally e.g. with the help of third party IoT platform providers bypassing the service offerings of the operator NW 2.

Also, the existing charging is based on usage parameters such as volume (amount of data traffic), duration etc. which may not make sense in case of IoT M2M since it may not be reasonable to charge the user for bytes (data charging) or duration of usage since the devices 5 may exchange lots of broadcast/control messages, all of which may not add value to the end user owning and using the IoT M2M devices 5.

Embodiments of the methods of the present disclosure instead involves,

1. Determining the number of devices 5 involved in a successful IoT M2M service session, providing a service to an end user.

2. Creating a rating rule in the rating engine of the operator NW 2, e.g. in the OCS 8, that calculates the appropriate rate based on the determined number of devices 5 and (possibly) also on the characteristics, e.g. service class (SC), of the devices involved in the service session.

Figure 2:
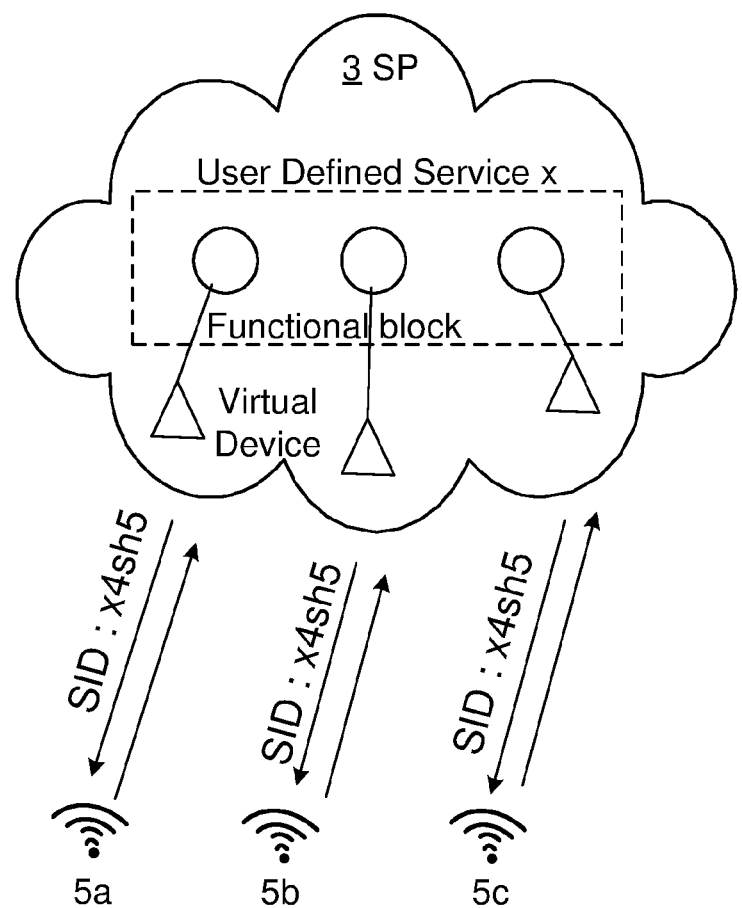
FIG. 2 is a schematic illustration of an embodiment of registration of M2M devices for a service session, in accordance with the present disclosure.

As shown the FIG. 2, the devices 5 that participate in a service session provide a given service x to the end users may be identified by correlating the Session Ticket (RFC 5077) information captured from the SP 3 that orchestrates the different devices 5 to provide the service session over a period of time.

A new extension type and extension data under the Transport Layer Security (TLS) Extensions (RFC 4366) of IETF that is part of the session ticket structure may be used to (e.g. uniquely) identify the devices 5 that participate in a session of a service x. An example of the new extension type is given below.

```
Extension Type: ServiceClass { uint 2 SC} :
enum {
0-   Smart House,
1-   Personal health care,
n- <Any user-defined service>
}
Extension Data: Service Id
   { uint16 SID }
Extension Data: Service Time to Live
   { uint16 S-TTL }
```

The service identifier (SID), here session 4sh5 of service x, may be defined to be e.g. a random number that identifies (e.g. uniquely) an instance of a service type for a particular user, thus forming a service session. By means of this definition at the transport layer allows the operator NW 2 to be agnostic to any application layer or network layer protocols. The Service Time to Live (S-TTL) defines the duration of the service session, wherein after the time period of said duration has expired the session is terminated.

As is shown in FIG. 2, the physical devices 5 (here three devices 5a, 5b and 5c are shown as an example) communicates via the operator NW 2 with the SP 3 where the service x is defined with virtual devices corresponding to the physical M2M devices 5. Thus, the M2M devices 5 discussed herein may in some embodiments be physical devices, but may in other embodiments be virtual devices or a combination of virtual and physical devices 5.

Figure 3:
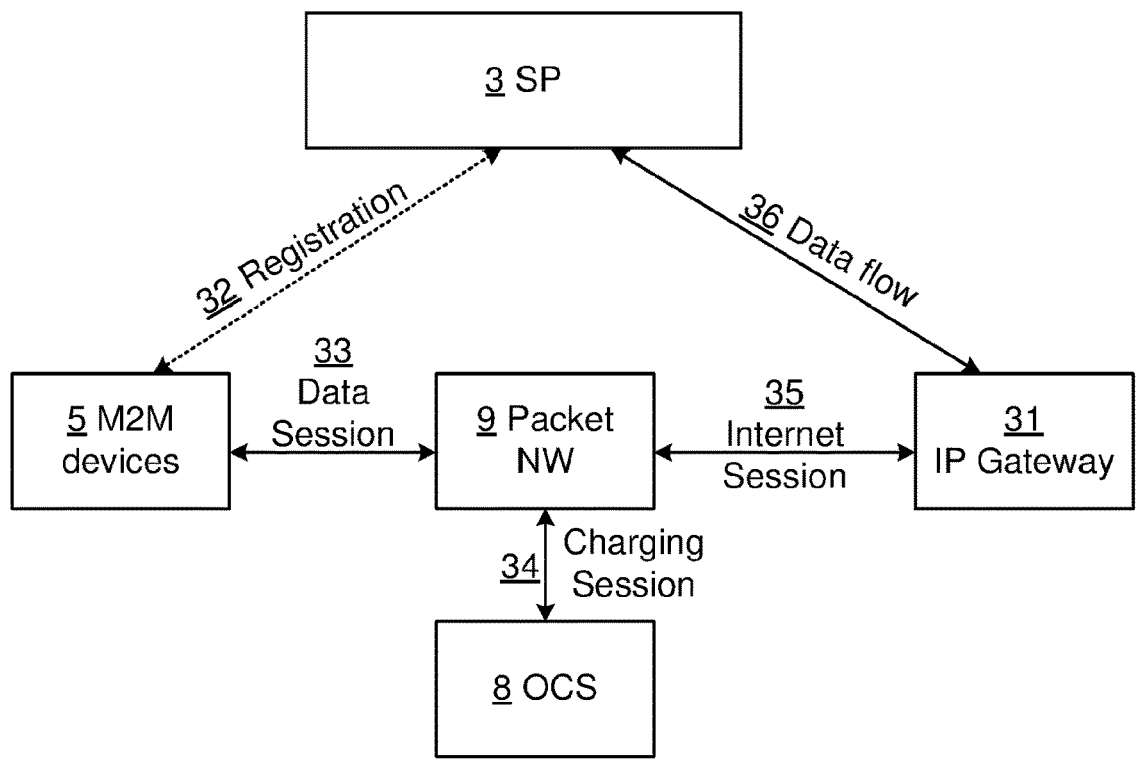
FIG. 3 is a schematic block diagram illustrating communication flows within an embodiment of a communication network, in accordance with the present disclosure.

FIG. 3 illustrates communication paths within the communication network 1. In a registration session 32, the M2M devices 5 registers with the SP 3 for providing a service x, wherein the registration session may comprise a service triggering message from any of the M2M devices 5 which causes the SP 3 to set up the a service session of the service x. The communication between the SP 3 and the devices 5 may be via a data session 33 between the devices 5 and the packet NW 9, and internet session 35 between the packet NW 9 and an Internet Protocol (IP) gateway 31 and a data flow 36 between the IP gateway 31 and the SP 3. Between the OCS 8 and the Packet NW 9 there may be a charging session 34 in which the OCS obtains the information needed for calculating the charging rate and charging the service session. IoT M2M devices 5 register with the SP 3 for the configuration of the service x, monitoring and action initiation. The IoT M2M service provider 3 may be hosted as a cloud services provider in the Internet (via the IP gateway 31). The devices 5 may communicate with the SP via the packet network 9 and the OCS 8.

Figure 4:
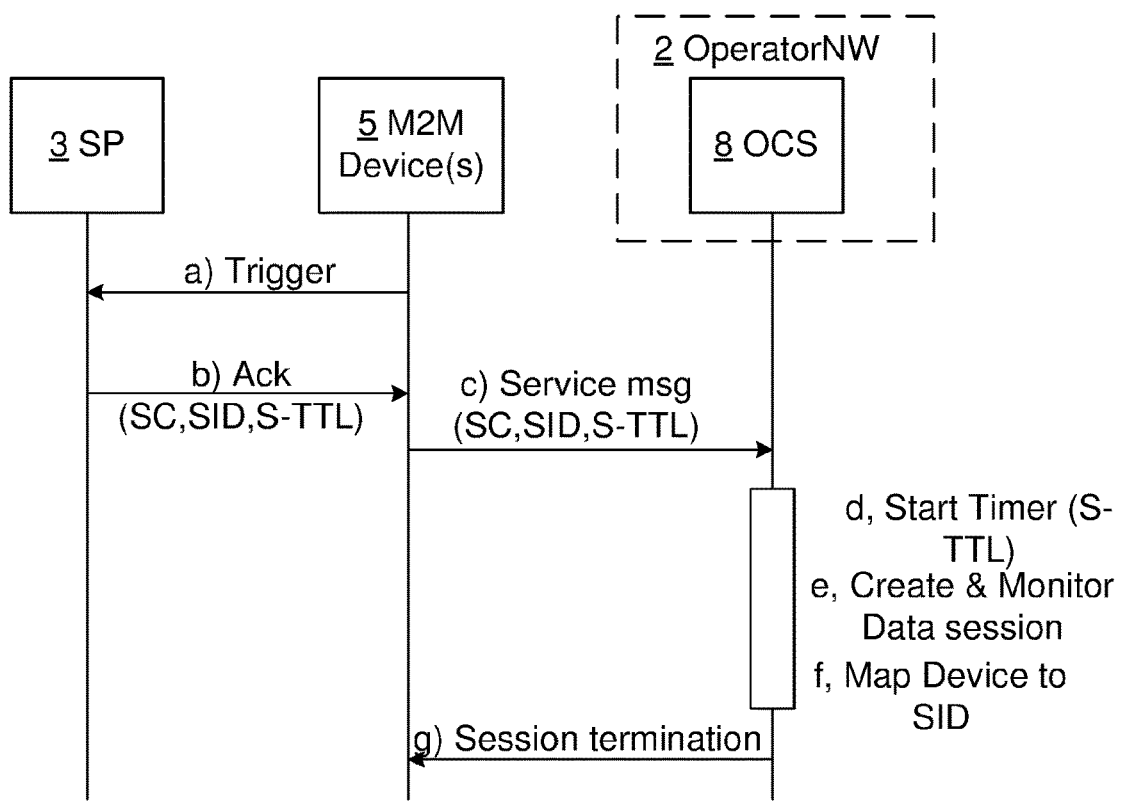
FIG. 4 is a schematic signal diagram of embodiments of the methods of the present disclosure.

FIG. 4 exemplifies signalling within the communication network 1 for setting up and controlling a service session. At least one, possibly each, of the M2M devices 5 which will be involved in the service session sends a service triggering message a) to the SP 3 as part of the registration process 32. In response, the SP 3 sets up the service session and sends an acknowledgement message b) back to the device(s) 5, the acknowledge message b) comprising the SID (as decided by the SP) of the service session, as well as optionally the additional parameters SC of the device(s) and/or the TTL of the service session (herein also called S-TTL). Then, each of the M2M devices 5 involved in the service session, sends a service message c) to the operator NW 2, which service message c) comprises said parameters SID and any of said SC and TTL, such that this information may be used by the OCS 8. Thus, the devices 5 initiates the data session in the OCS e.g. via the packet NW 9. The operator NW 2, e.g. the OCS 8, may then (step d) start a charging session and the timer of the S-TTL, create and monitor the data session 33 (step e) and, by means of the SID, map the devices 5 to the service session, allowing the number of devices involved in the service session to be counted during the duration of, or after termination of, the service session. When the TTL timer has expired, the service session is terminated by the operator NW sending a session termination message g) to the M2M devices.

Figure 5:
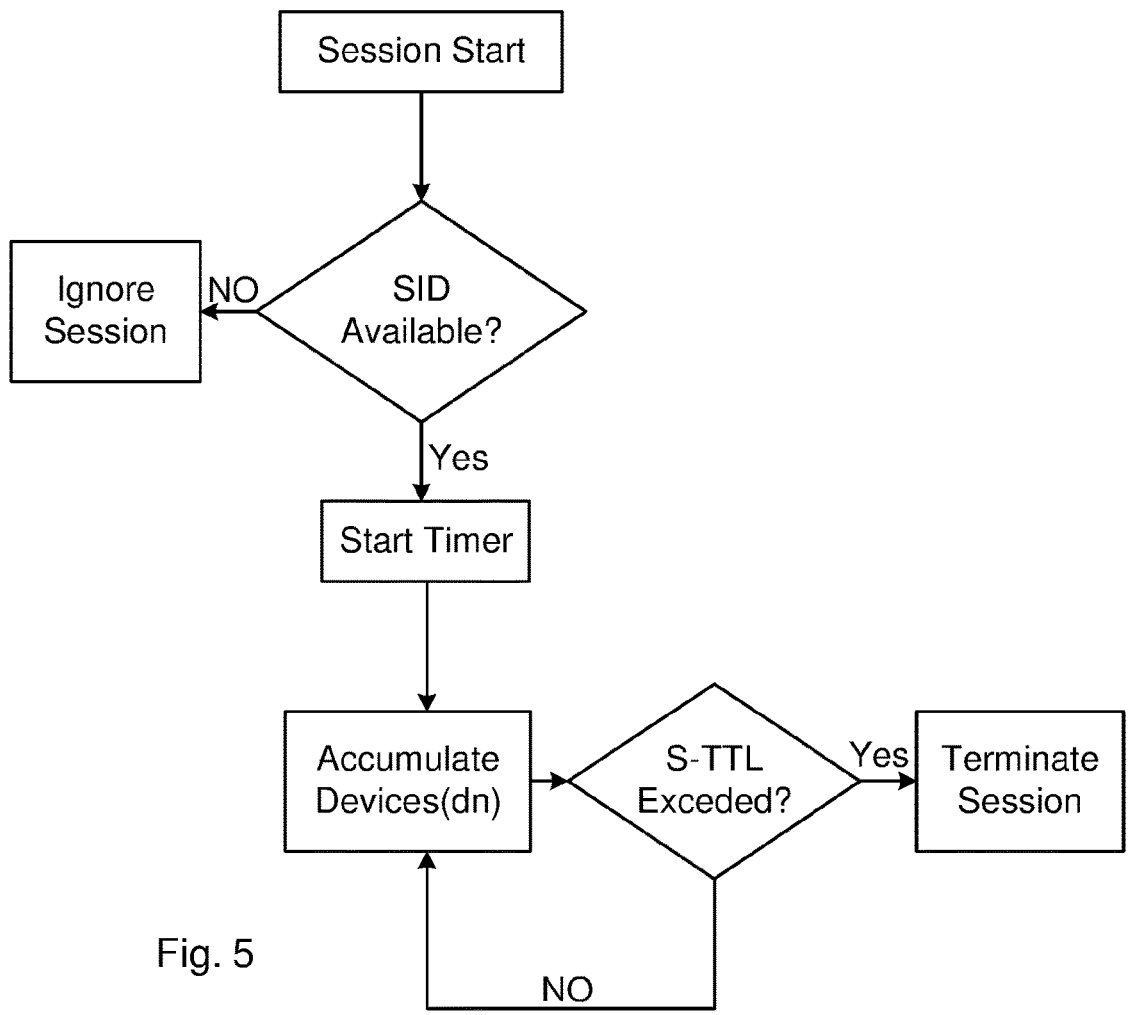
FIG. 5 is a schematic flow chart of an embodiment of association of M2M devices with a service session in an operator network, in accordance with the present disclosure.

FIG. 5 illustrates an example of activity flow in the charging session 34. When starting the service session, the OCS 8 makes sure that a SID for the session has been received and is thus available. If not, the session is ignored/not started. Provided that the SID is available, the timer for the session duration (typically the received S-TTL) is started. During the session, while the timer is running, information about the devices 5 which are involved is accumulated, associating the devices with the session by mean of the SID, such that the number of involved devices can be determined at the end of the session. The information continues to be accumulated until the S-TTL is exceeded, i.e. till the timer expires, whereby the session is terminated.

Figure 6:
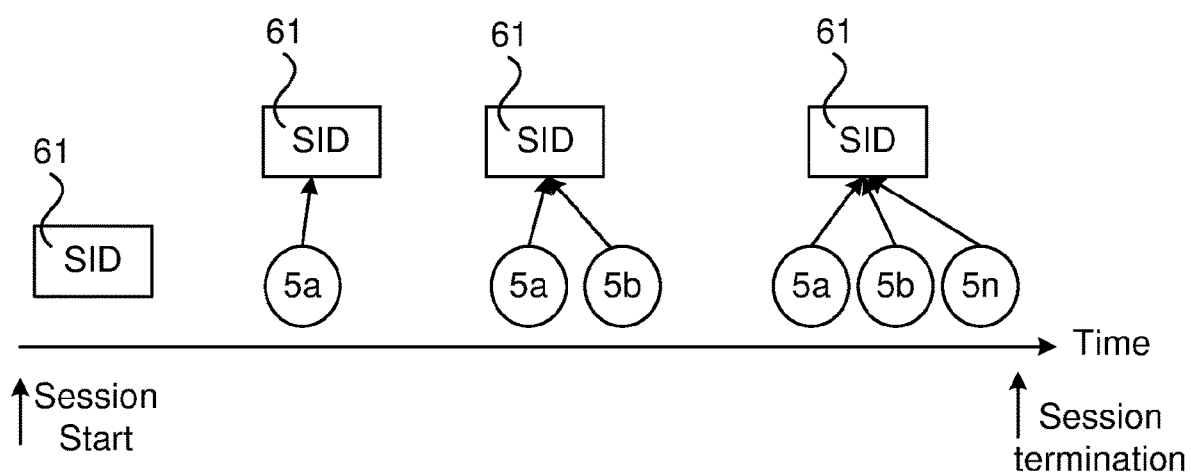
FIG. 6 schematically illustrates how a plurality of M2M devices are, over a Time to Live (TTL) time period of a service session, associated with a SID of the service session in the operator network, in accordance with the present disclosure.

FIG. 6 illustrates how the operator NW 2, e.g. the OCS 8, associates devices 5 with the session based on the SID 61 of the session over the duration of said session from the start of the session to the termination of the session. First the session is set up with the associated SID. Typically, the session is started by the first device 5 presenting the SID connecting to the operator NW 2. Then, each device 5 presenting the SID 61 is associated with the session. In the example of FIG. 6, a first device 5a is over time followed by a second device 5b and further devices until the last device 5n. Thus, at the termination of the session, it is known how many devices 5 have been involved in the session, i.e. the number of devices associated with the SID 61, and the charging rate may be calculated.

The rating rule for the charging rate may be based on the following criteria:

1. The number of devices 5 participating/being involved in the IoT M2M service session for providing an end user service x.

2. Device service class (SC) e.g. based on criticality of the service x, e.g. devices involved in healthcare may have a high criticality. The device criticality may be derived from the SC in accordance with the TLS Extensions (IETF RFC 4366).

3. Device Type (e.g. Constrained/non-constrained device, in accordance with IETF RFC7228). Typically, a constrained device is dependent on battery power and may thus need to limit power consumption.

A rating rule based on the above criteria may be represented by the following mathematical expression giving the price of the session after the session has been terminated, $$\sum_{i=1}^{n}(d_i*w_i)*X \quad (1)$$

where,
w is the weight of a device, $$w=\mathcal{F}(d_c, d_t, d_n) \quad (2)$$

where, $d_c$ is a device criticality based on its function, e.g. range (0-10) where <3 denotes low criticality, 6-3 moderate criticality and >6 high criticality.

$d_t$ is a device class where e.g. "1" may denote a constrained device and "2" a not constrained device.

$d_n$ is the number of devices 5 involved in the service session i.e. the number of devices associated with the SID during the duration of the session.

X is a price defined by the operator of the operator NW 2 based on a pricing model of the operator.

The calculated rate, e.g. by using the above dynamic pricing rule, may be used to deduct the user account in case of prepaid subscription or be accumulated in case of a post-paid account. This simplifies the configuration required for charging the sessions in IoT situations.

The device SC classification based on the criticality weight function of the devices 5, in addition to support in price determination also helps in the following:

1. Credit control decisions i.e. if the user account has no money left, then the devices may or may not continue providing the service x e.g. if the device is involved in healthcare monitoring systems and the user does not have sufficient amount of money in the account, then the services may still be provided (possibly with a surcharge), since interrupting the service may result in serious consequences. Hence, the device classification based on a criticality weight function may help in allowing over-draft of the account.

2. Policy enforcement decisions, e.g. to set the bandwidth and quality of service (QoS) parameters in the IoT devices 5 so that the traffic may be prioritized accordingly, e.g. healthcare monitoring traffic from the devices may be prioritized over e.g. agricultural monitoring traffic.

Thus, in some embodiments of the present invention, the operator network 2 may, e.g. based on a SC received as part of the service message c), determine that the service session is allowed, before the determining of the number of M2M devices involved in said service session. For instance, if the SC, and possibly an associated QoS, indicates that the devices 5 are critical, e.g. related to healthcare/medical issues, the operator network may determine that the service session is allowed regardless of any lack of funds in a prepaid subscription for access to the operator network. On the other hand, if the received SC indicates that the devices 5 are not critical, the service session may not be allowed, in which case the service session will not be set up by the operator network.

Further, in some embodiments of the present invention, the QoS for the service session is set based on the SC received as part of the service message c).

Figure 7A:
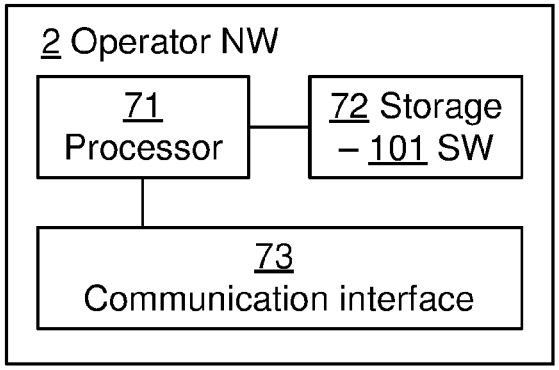
FIG. 7a is a schematic block diagram of an embodiment of an operator network (NW), in accordance with the present disclosure.

FIG. 7a schematically illustrates an embodiment of an operator NW 2 (e.g. comprising an OCS 8) of the present disclosure. The operator NW 2 comprises processing circuitry 71 e.g. a central processing unit (CPU). The processing circuitry 71 may comprise one or a plurality of processing units in the form of microprocessor(s). However, other suitable devices with computing capabilities could be comprised in the processing circuitry 71, e.g. an application specific integrated circuit (ASIC), a field programmable gate array (FPGA) or a complex programmable logic device (CPLD). The processing circuitry 71 is configured to run one or several computer program(s) or software (SW) 101 (see also FIG. 10) stored in a storage 72 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processing circuitry 71 may also be configured to store data in the storage 72, as needed. The operator NW 2 also comprises a communication interface 73 for wired or wireless communication with e.g. M2M devices 5 and the SP 3.

According to an aspect of the present disclosure, there is provided an operator network 2 configured for providing data network connectivity to M2M devices 5. The operator network comprises processing circuitry 71, and storage 72 storing instructions 101 executable by said processing circuitry whereby said operator network is operative to from each of a plurality of M2M devices involved in a service session, receive a service message c) comprising a SID 61 corresponding to the service session. The operator network is also operative to, by means of the received SID from each of the plurality of M2M devices, determine the number of M2M devices involved in the service session. The operator network is also operative to, based on the determined number of M2M devices, calculate a charging rate for the service session. The operator network is also operative to, using the calculated rate, charge the service session.

Figure 7B:
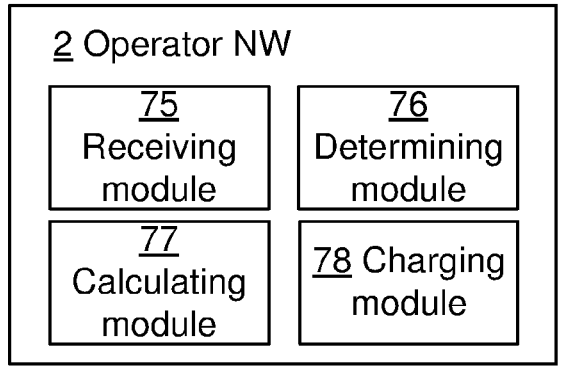
FIG. 7b is a schematic functional block diagram of an embodiment of an operator network (NW), in accordance with the present disclosure.

FIG. 7b is a schematic block diagram functionally illustrating an embodiment of the operator NW 2 in figure 7a. As previously mentioned, the processing circuitry 71 may run software 101 for enabling the operator NW 2 (e.g. the OCS 8) to perform an embodiment of a method of the present disclosure, whereby functional modules may be formed in operator NW 2 e.g. in the processing circuitry 71 for performing the different steps of the method. These modules are schematically illustrated as blocks within the operator NW 2. Thus, the operator NW 2 comprises a receiving module 75 for, from each of the plurality of M2M devices 5 involved in the service session, receiving a service message c) comprising a SID 61 corresponding to the service session. The operator NW also comprises a determining module 76 for, by means of the received SID from each of the plurality of M2M devices, determining the number of M2M devices involved in the service session. The operator NW also comprises a calculating module for, based on the determined number of M2M devices, calculating a charging rate for the service session. The operator NW also comprises a charging module 78 for, by using the calculated rate, charging the service session.

Figure 8A:
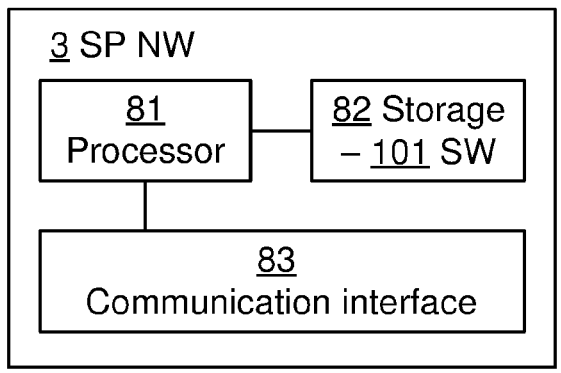
FIG. 8a is a schematic block diagram of an embodiment of a service provider NW, in accordance with the present disclosure.

FIG. 8a schematically illustrates an embodiment of an SP NW 3 (e.g. in a cloud) of the present disclosure. The SP NW 3 comprises processing circuitry 81 e.g. a central processing unit (CPU). The processing circuitry 81 may comprise one or a plurality of processing units in the form of microprocessor(s). However, other suitable devices with computing capabilities could be comprised in the processing circuitry 81, e.g. an application specific integrated circuit (ASIC), a field programmable gate array (FPGA) or a complex programmable logic device (CPLD). The processing circuitry 81 is configured to run one or several computer program(s) or software (SW) 101 (see also FIG. 10) stored in a storage 82 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processing circuitry 81 may also be configured to store data in the storage 82, as needed. The SP NW 3 also comprises a communication interface 8 3 for wired or wireless communication with e.g. M2M devices 5 and the operator NW 2.

According to an aspect of the present disclosure, there is provided a service provider network 3 configured for providing a service x to a user by means of a plurality of M2M devices 5. The service provider network comprises processing circuitry 81, and storage 82 storing instructions 101 executable by said processing circuitry whereby said service provider network is operative to, from each of the plurality of M2M devices, receive a service triggering message a). The service provider network is also operative to, in response to the received service triggering messages, send an acknowledgement message b) to each of the plurality of M2M devices, the acknowledgement message comprising a SID 61 corresponding to the service session and being configured for being presented to an OCS 8.

Figure 8B:
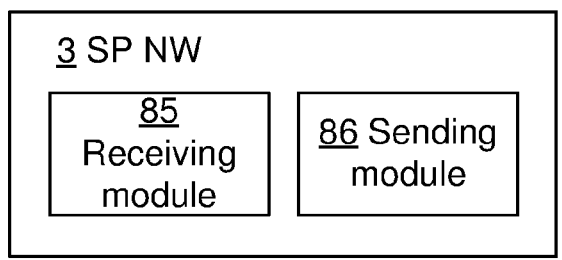
FIG. 8b is a schematic functional block diagram of an embodiment of a service provider NW, in accordance with the present disclosure.

FIG. 8b is a schematic block diagram functionally illustrating an embodiment of the SP NW 3 in FIG. 8a. As previously mentioned, the processing circuitry 81 may run software 101 for enabling the SP NW 3 (e.g. a cloud) to perform an embodiment of a method of the present disclosure, whereby functional modules may be formed in SP NW 3 e.g. in the processing circuitry 81 for performing the different steps of the method. These modules are schematically illustrated as blocks within the SP NW 3. Thus, the SP NW 3 comprises a receiving module 85 for, from each of the plurality of M2M devices 5, receiving a service triggering message a). The SP NW 3 also comprises a sending module 86 for, in response to the received service triggering messages, sending an acknowledgement message b) to each of the plurality of M2M devices, the acknowledgement message comprising an SID 61 corresponding to the service session and being configured for being presented to an OCS 8.

Figure 9A:
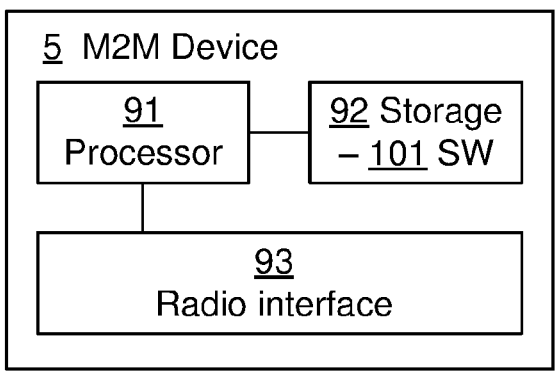
FIG. 9a is a schematic block diagram of an embodiment of an M2M device, in accordance with the present disclosure.

FIG. 9a schematically illustrates an embodiment of an M2M device 5 of the present disclosure. The M2M device 5 comprises processing circuitry 91 e.g. a central processing unit (CPU). The processing circuitry 91 may comprise one or a plurality of processing units in the form of microprocessor(s). However, other suitable devices with computing capabilities could be comprised in the processing circuitry 91, e.g. an application specific integrated circuit (ASIC), a field programmable gate array (FPGA) or a complex programmable logic device (CPLD). The processing circuitry 91 is configured to run one or several computer program(s) or software (SW) 101 (see also FIG. 10) stored in a storage 92 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processing circuitry 91 may also be configured to store data in the storage 92, as needed. The M2M device 5 also comprises a communication/radio interface 93 for wireless communication via e.g. the radio NW 7 or a router 6.

According to an aspect of the present disclosure, there is provided an M2M device 5 comprising processing circuitry 91, and storage 92 storing instructions 101 executable by said processing circuitry whereby said M2M device is operative to send a service triggering message a) to a service provider network 3 providing a service x to a user by means of the M2M device. The M2M device is also operative to, in response to the sent service triggering message, receive an acknowledgement message b) comprising a SID 61 corresponding to a service session of the service x. The M2M device is also operative to, to an operator network 2 providing data network connectivity to the M2M device, send a service message c) comprising the SID.

Figure 9B:
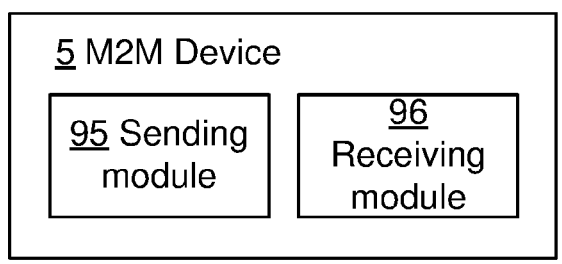
FIG. 9b is a schematic functional block diagram of an embodiment of an M2M device, in accordance with the present disclosure.

FIG. 9b is a schematic block diagram functionally illustrating an embodiment of the M2M device 5 in FIG. 9a. As previously mentioned, the processing circuitry 91 may run software 101 for enabling the device 5 to perform an embodiment of a method of the present disclosure, whereby functional modules may be formed in device 5 e.g. in the processing circuitry 91 for performing the different steps of the method. These modules are schematically illustrated as blocks within the device 5. Thus, the M2M device 5 comprises a sending module 95 for sending a service triggering message a) to a service provider network 3 providing a service to a user by means of the M2M device. The M2M device 5 also comprises a receiving module 96 for, in response to the sent service triggering message, receiving an acknowledgement message b) comprising a SID 61 corresponding to a service session of the service x. The sending module 95 is also for, to an operator network 2 providing data network connectivity to the M2M device, sending a service message c) comprising the SID.

Further, according to an aspect of the present disclosure, a communication network 1 is provided, comprising an embodiment of the operator network 2, an embodiment of the service provider network 3, and a plurality of M2M devices 5.

Figure 10:
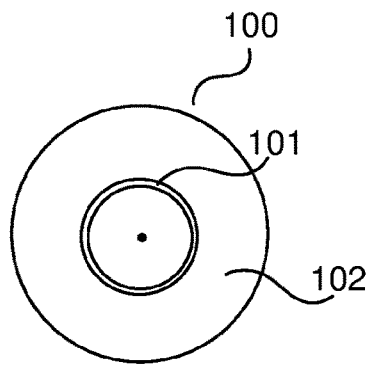
FIG. 10 is a schematic illustration of an embodiment of a computer program product of the present disclosure.

FIG. 10 illustrates an embodiment of a computer program product 100. The computer program product 100 comprises a computer readable (e.g. non-volatile and/or non-transitory) medium 102 comprising software/computer program 101 in the form of computer-executable components. The computer program 101 may be configured to cause an operator NW 2, an SP NW 3 and/or a M2M device 5, e.g. as discussed herein, to perform an embodiment of a method of the present disclosure. The computer program may be run on the processor circuitry 71/81/91 of the operator NW 2, an SP NW 3 and/or a M2M device 5 for causing it to perform the method. The computer program product 100 may e.g. be comprised in a storage unit or memory 72/82/92 comprised in the operator NW 2, an SP NW 3 and/or a M2M device 5 and associated with the processor circuitry 71/81/91. Alternatively, the computer program product 100 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 100 comprising computer-executable components 101 for causing an operator network 2 to perform an embodiment of a method of the present disclosure when the computer-executable components are run on processing circuitry 71 comprised in the operator network.

According to another aspect of the present disclosure, there is provided a computer program product 100 comprising computer-executable components 101 for causing a service provider network 3 to perform an embodiment of a method of the present disclosure when the computer-executable components are run on processing circuitry 81 comprised in the service provider network.

According to another aspect of the present disclosure, there is provided a computer program product 100 comprising computer-executable components 101 for causing a M2M device 5 to perform an embodiment of a method of the present disclosure when the computer-executable components are run on processing circuitry 91 comprised in the M2M device.

Figure 11:
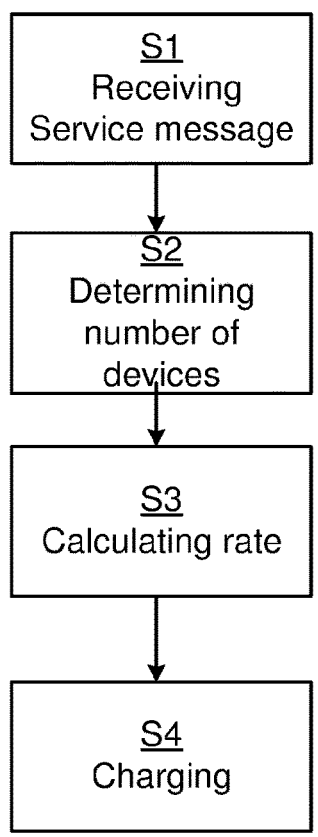
FIG. 11 is a schematic flow chart of an embodiment of a method performed in an operator network, in accordance with the present disclosure.

FIG. 11 is a schematic flow chart of an embodiment of a method performed in an operator network 2 providing data network connectivity to M2M devices 5. The method is for charging of a service session involving a plurality of the M2M devices. From each of the plurality of M2M devices involved in the service session, a service message c) comprising an SID 61 corresponding to the service session is received S1. By means of the received S1 SID from each of the plurality of M2M devices, the number of M2M devices 5 involved in the service session is determined S2. Based on the determined S2 number of M2M devices 5, a charging rate for the service session is calculated S3. By using the calculated S3 rate, the service session is charged S4.

Figure 12:
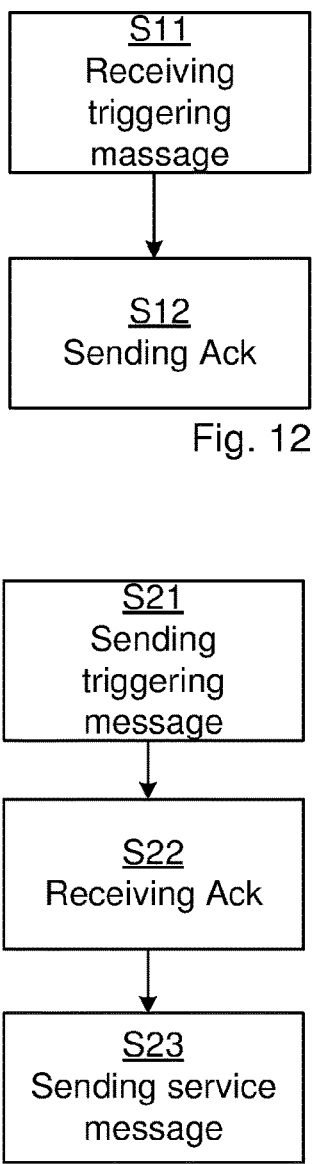
FIG. 12 is a schematic flow chart of an embodiment of a method performed in a service provider network, in accordance with the present disclosure.

FIG. 12 is a schematic flow chart of an embodiment of a method performed in an SP NW 3 providing a service x to a user by means of a plurality of M2M devices 5. The method is for facilitating charging of a service session of the service involving the plurality of M2M devices. From each of the plurality of M2M devices 5, a service triggering message a) is received S11. In response to the received S1 service triggering messages a), an acknowledgement (Ack) message b) is sent S12 to each of the plurality of M2M devices 5, the acknowledgement message comprising an SID 61 corresponding to the service session and being configured for being presented to an OCS 8.

Figure 13:
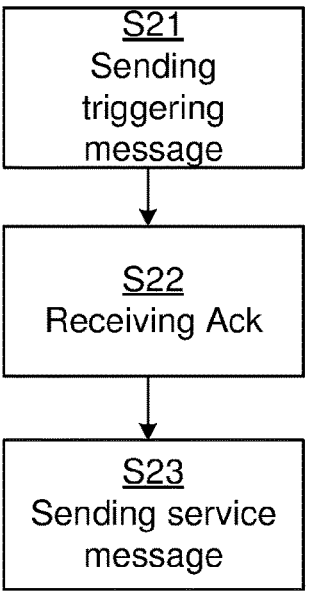
FIG. 13 is a schematic flow chart of an embodiment of a method performed in a M2M device, in accordance with the present disclosure.

FIG. 13 is a schematic flow chart of an embodiment of a method performed by an M2M device 5. The method is for facilitating charging of a service session involving the M2M device. A service triggering message a) is sent S21 to a service provider network 3 providing a service x to a user by means of the M2M device. In response to the sent S21 service triggering message, an acknowledgement message b) comprising an SID 61 corresponding to a service session of the service is received S22. To an operator network 2 providing data network connectivity to the M2M device 5, a service message c) comprising the SID is sent S23.

Figure 14:
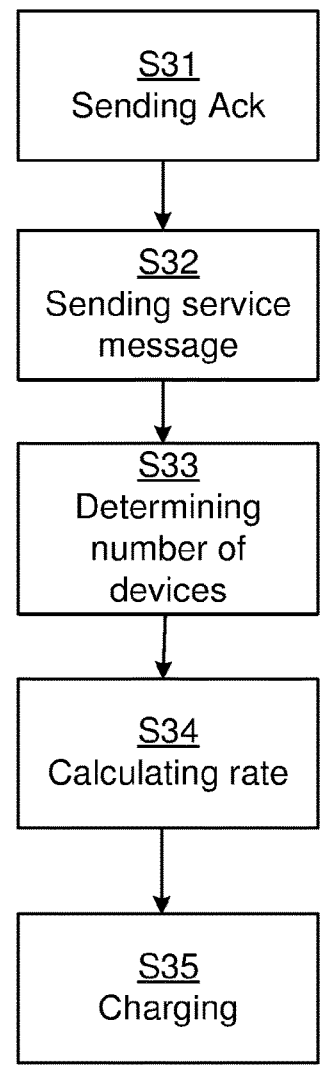
FIG. 14 is a schematic flow chart of an embodiment of a method performed in a communication network, in accordance with the present disclosure.

FIG. 14 is a schematic flow chart of an embodiment of a method performed in a communication network i comprising a service provider network 3 and an operator network 2. The method is for facilitating charging of a service session provided by the service provider network by means of a plurality of M2M devices 5 being provided with data network connectivity by the operator network. The service provider network sends S31 an acknowledgement message b) to each of the plurality of M2M devices to be involved in the service session. The acknowledgement message comprises an SID 61 corresponding to the service session. Each of the plurality of M2M devices 5 involved in the service session sends S32 a service message c) comprising the SID to the operator network 2. By means of the SID from each of the plurality of M2M devices, the operator network determines S33 the number of M2M devices involved in the service session. Based on the determined S33 number, a charging rate for the service session is calculated S34. By using the calculated S34 rate, the service session is charged S35.

In some embodiments of the present disclosure, the service message(s) c), sent S23 by the M2M device(s) 5 and received S1 by the operator NW 2, comprises a TTL time period, wherein the service session is terminated in response to the TTL time period expiring.

In some embodiments of the present disclosure, the number of M2M devices 5 involved in the service session is determined S2 after the service session has been terminated.

In some embodiments of the present disclosure, the service message c), sent S23 by the M2M device(s) 5 and received S1 by the operator NW 2, comprises a Service Class (SC) identifying which of a plurality of predefined SC the plurality of M2M devices belong to, e.g. indicating criticality of the service and the devices involved in the service session. In some embodiments, the charging rate is calculated S3 based also on the SC.

In some embodiments of the present disclosure, the service messages c) are comprised in TLS extensions, e.g. as defined by IETF.

In some embodiments of the present disclosure, the acknowledgement message b), sent S12 by the SP NW 3 and received S22 by the M2M device(s) 5, comprises a TTL time period for terminating the service session in response to the TTL time period expiring.

In some embodiments of the present disclosure, the acknowledgement message b), sent S12 by the SP NW 3 and received S22 by the M2M device(s) 5, comprises a Service Class (SC) identifying which of a plurality of predefined SC the plurality of M2M devices 5 belong to, e.g. indicating criticality of the service and the devices involved in the service session.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in an operator network providing data network connectivity to Machine-to-Machine (M2M) devices, for charging of a service session involving a plurality of the M2M devices, the method comprising:

from each of the plurality of M2M devices involved in the service session, receiving a service message comprising a service identifier (SID) corresponding to the service session, wherein the service message received from at least one of the plurality of the M2M devices comprises a Service Class (SC) identifying which of a plurality of predefined SC the plurality of the M2M devices belong to;

determining the number of M2M devices involved in the service session using the received SID from each of the plurality of M2M devices;

based on the determined number of M2M devices and the received SC, calculating a charging rate for the service session; and charging the service session using the calculated rate.

2. The method of claim 1, wherein the service message received from at least one of the plurality of M2M devices comprises a Time-to-Live (TTL) time period, wherein the service session is terminated in response to the TTL time period expiring.

3. The method of claim 1, wherein the number of M2M devices involved in the service session is determined after the service session has been terminated.

4. The method of claim 1, further comprising, based on the received SC, determining that the service session is allowed, before the determining of the number of M2M devices involved in said service session.

5. The method of claim 1, wherein a Quality of Service (QoS) for the service session is set based on the received SC.

6. The method of claim 1, wherein the service messages are comprised in Transport Layer Security (TLS) extensions as defined by the Internet Engineering Task Force (IETF).

7. A computer program product comprising a non-transitory computer readable medium storing computer-executable program code for causing an operator network to perform the method of claim 1 when the computer-executable program code is run on processing circuitry comprised in the operator network.

8. An operator network configured for providing data network connectivity to Machine-to-Machine (M2M) devices, the operator network comprising:
processing circuitry; and
non-transitory storage storing instructions executable by said processing circuitry whereby said operator network is operative to:
from each of a plurality of M2M devices involved in a service session,
receive a service message comprising a service identifier (SID) corresponding to the
service session, wherein the service message received from at least one of the plurality of the M2M devices comprises a Service Class (SC) identifying which of a plurality of predefined SC the plurality of the M2M devices belong to;
determine the number of M2M devices involved in the service session using the received SID from each of the plurality of M2M devices;
based on the determined number of M2M devices and the received SC, calculate a charging rate for the service session; and
charge the service session using the calculated rate.

9. A method performed in a service provider network providing a service to a user by means of a plurality of Machine-to-Machine (M2M) devices, for facilitating charging of a service session involving the plurality of M2M devices, the method comprising:
from each of the plurality of M2M devices, receiving the service triggering message; and
in response to the received service triggering messages, sending an acknowledgement message to each of the plurality of M2M devices, the acknowledgement message comprising a service identifier (SID) corresponding to the service session and being configured for being presented to an online charging system (OCS) and a Service Class (SC) identifying which of a plurality of predefined SC the plurality of M2M devices belong to.

10. The method of claim 9, wherein the acknowledgement message to at least one of the plurality of M2M devices comprises a Time-to-Live (TTL) time period for terminating the service session in response to the TTL time period expiring.

11. A computer program product comprising a non-transitory computer readable medium storing computer-executable program code for causing a service provider network to perform the method of claim 9 when the computer-executable program code is run on processing circuitry comprised in the service provider network.

12. A service provider network configured for providing a service to a user by means of a plurality of Machine-to-Machine (M2M) devices, the service provider network comprising:
processing circuitry; and
non-transitory storage storing instructions executable by said processing circuitry whereby said service provider network is operative to:
from each of the plurality of M2M devices, receive the service triggering message; and
in response to the received service triggering messages, send an acknowledgement message to each of the plurality of M2M devices, the acknowledgement message comprising a service identifier (SID) corresponding to the service session and being configured for being presented to an online charging system (OCS) and a Service Class (SC) identifying which of a plurality of predefined SC the plurality of M2M devices belong to.

13. A method performed by a Machine-to-Machine (M2M) device, for facilitating charging of a service session involving the M2M device, the method comprising:
sending a service triggering message to a service provider network providing a service to a user by means of the M2M device;
in response to the sent service triggering message, receiving an acknowledgement message comprising a service identifier (SID) corresponding to a service session of the service and a Service Class (SC) identifying which of a plurality of predefined SC the plurality of M2M devices belong to; and
to an operator network providing data network connectivity to the M2M device, sending a service message comprising the SID.

14. A computer program product comprising a non-transitory computer readable medium storing computer-executable program code for causing a M2M device to perform the method of claim 13 when the computer-executable program code is run on processing circuitry comprised in the M2M device.

15. A Machine-to-Machine (M2M) device comprising:
processing circuitry; and
storage storing instructions executable by said processing circuitry whereby said M2M device is operative to:
send a service triggering message to a service provider network providing a service to a user by means of the M2M device;
in response to the sent service triggering message, receive an acknowledgement message comprising a service identifier (SID) corresponding to a service session of the service and a Service Class (SC) identifying which of a plurality of predefined SC the plurality of M2M devices belong to; and to an operator network providing data network connectivity to the M2M device, send a service message comprising the SID.

16. A method performed in a communication network comprising a service provider network and an operator network, for facilitating charging of a service session provided by the service provider network by means of a plurality of Machine-to-Machine (M2M) devices being provided with data network connectivity by the operator network, the method comprising:

the service provider network sending an acknowledgement message to each of the plurality of M2M devices to be involved in the service session, the acknowledgement message comprising a service identifier (SID) corresponding to the service session and a Service Class (SC) identifying which of a plurality of predefined SC the plurality of M2M devices belong to;

each of the plurality of M2M devices involved in the service session sending a service message comprising the SID to the operator network;

the operator network determining the number of M2M devices involved in the service session using the SID from each of the plurality of M2M devices;

based on the determined number, calculating a charging rate for the service session; and charging the service session using the calculated rate.

* * * * *